United States Patent
Fukuoka et al.

[11] Patent Number: 5,621,260
[45] Date of Patent: Apr. 15, 1997

[54] CORELESS MOTOR

[75] Inventors: Kodo Fukuoka, Hino-gun; Kouji Kuyama, Yonago; Miyuki Furuya, Yonago; Hironobu Nishida, Yonago; Hiroto Inoue, Hirakata; Yukihiro Okada, Moriguchi, all of Japan

[73] Assignee: Matsushita Electric Industrial Co., Ltd., Osaka, Japan

[21] Appl. No.: 131,534

[22] Filed: Oct. 1, 1993

[30] Foreign Application Priority Data

| Oct. 7, 1992 | [JP] | Japan | 4-268507 |
| Jan. 18, 1993 | [JP] | Japan | 5-005561 |
| May 18, 1993 | [JP] | Japan | 5-115720 |

[51] Int. Cl.$^6$ ............ H02K 21/26; H02K 5/04; H02K 7/08; H01R 39/32
[52] U.S. Cl. ............ 310/154; 310/89; 310/90; 310/40 MM; 310/234
[58] Field of Search ............ 310/266, 154, 310/67 R, 40 MM, 89, 90, 42, 234

[56] References Cited

U.S. PATENT DOCUMENTS

| 2,928,963 | 3/1960 | Bertsche | 310/266 |
| 3,475,632 | 10/1969 | Moresi | 310/266 |
| 3,514,654 | 5/1970 | Moresi | 310/154 |
| 4,123,679 | 10/1978 | Miyasaka | 310/40 MM |
| 4,127,785 | 11/1978 | Noguch | 310/89 |
| 4,327,304 | 4/1982 | Aoki | 310/40 MM |
| 4,337,568 | 7/1982 | Morisawa | 310/43 |
| 4,433,472 | 2/1984 | Andoh | 310/89 |
| 5,270,602 | 12/1993 | Takehara | 310/154 |

FOREIGN PATENT DOCUMENTS

| 843441 | 7/1952 | Germany . |
| 883171 | 8/1953 | Germany . |
| 61-26451 | 2/1986 | Japan . |
| 4275046 | 9/1992 | Japan . |

*Primary Examiner*—Clayton E. LaBalle
*Attorney, Agent, or Firm*—Panitch Schwarze Jacobs & Nadel, P.C.

[57] ABSTRACT

In a coreless motor, a shaft of the coreless motor does not pass through a magnet but is arranged in series with a columnar magnet on the same axis. The magnet is inserted in a tubular frame made of magnetic material and a coil which is mounted on the shaft is inserted in the gap between the outer surface of the magnet and the inner surface of the frame.

11 Claims, 19 Drawing Sheets

CORELESS MOTOR

FIELD OF THE INVENTION AND RELATED ART STATEMENT

1. Field of the Invention

The present invention relates generally to a coreless motor, and more particularly to a coreless motor which is slenderized in outer diameter.

2. Description of the Related Art

FIG. 23 is a cross section of a coreless motor of the prior art. Referring to FIG. 23, two bearings 2 are inserted in a cylindrical sleeve 1, and thereby a shaft 3 is rotatably supported in the sleeve 1. A tubular magnet 4 is located outside from the sleeve 1 in a coaxial manner, and is fastened by a flange 1A of the sleeve 1. A commutator 6 is mounted on an end part 3A of the shaft 3. A tubular coil 5 which has a slightly larger diameter than outer diameter of the magnet 4 is mounted on the flange 9 of the commutator 6 in a coaxial manner, and the inner face of the coil 5 faces to the outer wall of the magnet 4 with a predetermined gap. Brushes 7 is provided so as to contact the commutator 6.

The entire elements mentioned above are enclosed by a cylindrical frame 8 made of magnetic material, and a magnetic circuit is formed by the magnet 4 and the frame 8. The inner diameter of the frame 8 is made to be slightly larger than the outer diameter of the coil 5 so that the coil 5 rotates between the magnet 4 and the frame 8, and hence, a torque is obtainable through the shaft 3 connected to the coil 5.

The coreless motor is extensively used in electronic apparatuses and automated office machines. In order to miniaturize these apparatuses, it is desirable to provide a coreless motor slenderized in the outer diameter. The thickness of the bearing 2 and the thickness of the magnet 4 (which is equal to a half of a difference between the inner diameter and outer diameter) may be reduced in order to decrease the outer diameter of the coreless motor. On the other hand, if the thickness of the bearing 2 is reduced, strength against a force applied to the inner wall of the bearing 2 decreases and the life time thereof would be shortened. On the other hand, if the thickness of the magnet 4 is reduced in order to reduce the outer diameter, a sufficient torque is not obtained because of decrease of the volume of the magnet 4, and moreover demagnetization is liable to occur as a result of repeated variation of a circumferential temperature. Therefore, it has been difficult to reduce the outer diameter of the coreless motor having the conventional structure as shown in FIG. 23.

OBJECT AND SUMMARY OF THE INVENTION

An object of the present invention is to provide a slenderized coreless motor which is superior in torque characteristics and reliability.

The coreless motor in accordance with the present invention comprises:

a cylindrical frame of magnetic material having a circular hole, a columnar magnet inserted in the frame in a manner that the magnet is held by the frame with a gap between the inner wall of the frame and the outer wall of the columnar magnet, a shaft held rotatably on the frame in coaxial relation to the axis of the columnar magnet in series with the columnar magnet, and a circular cylindrical coil mounted coaxially on the shaft and positioned in the gap.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

[First embodiment]

Figure 1:
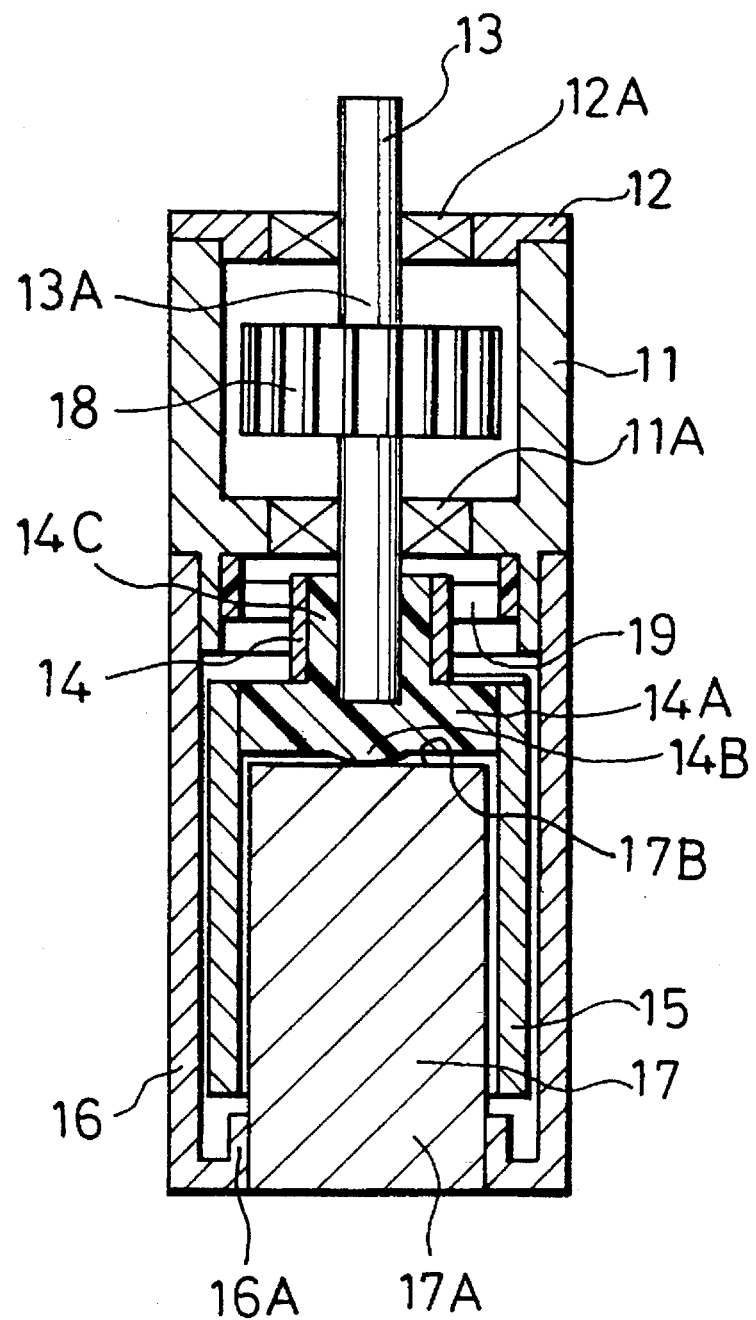
FIG. 1 is a cross section of a first embodiment of the coreless motor in accordance with the present invention.

FIG. 1 is a cross section of the coreless motor of a first embodiment in accordance with the present invention. Referring to FIG. 1, a cup-shaped housing 11 is provided with a side plate 12 at an opening, and a bearing 12A is mounted on the central part of the side plate 12. The other bearing 11A is mounted in the central part of the bottom of the housing 11. A shaft 13 is rotatably supported by the bearings 11A and 12A. A commutator 14 is mounted on a holder 14C connected to an end part of the shaft 13, and brushes 19 contact the commutator 14. The holder 14B is provided with a flange 14A, and a tubular coil 15 is connected to the flange 14A in a coaxial manner with the shaft 13. A tubular frame 16 is located outward from the coil 15 with a predetermined gap, and one end of the frame 16 is fixed to the housing 11. The other end of the frame 16 is formed to folded structure 16A, and thereby a bottom end 17A of a columnar magnet 17 is secured by maintaining a predetermined gap in the coil 15.

A round protrusion 14B formed at the center of the flange 14A contacts with the other end face 17B of the magnet 17, so that a downward thrust of the shaft 13 in FIG. 1 is supported by the contact of the round protrusion 14B upon the surface 17B. A gear 18 is mounted on the shaft 13 in the housing 11, for example, and rotation of the shaft 13 is transferred to other mechanism (not shown) through the gear 13.

Figure 2:
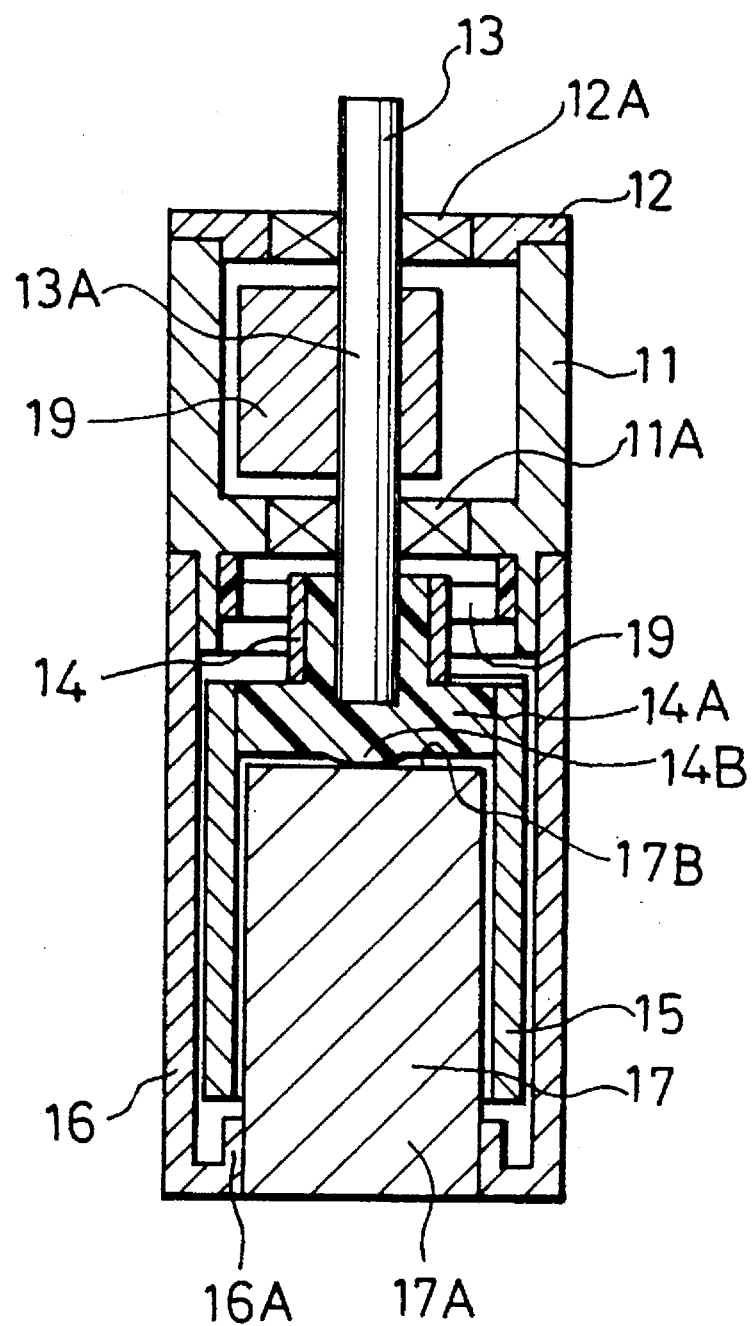
FIG. 2 is a cross section of an application of the first embodiment.

In a modified example, an eccentric wheel 19 may be mounted on the shaft 18 as replacement for the gear 18 as shown in FIG. 2, so as to serve as a small vibrator which is used in a beeper, for example.

Figure 23:
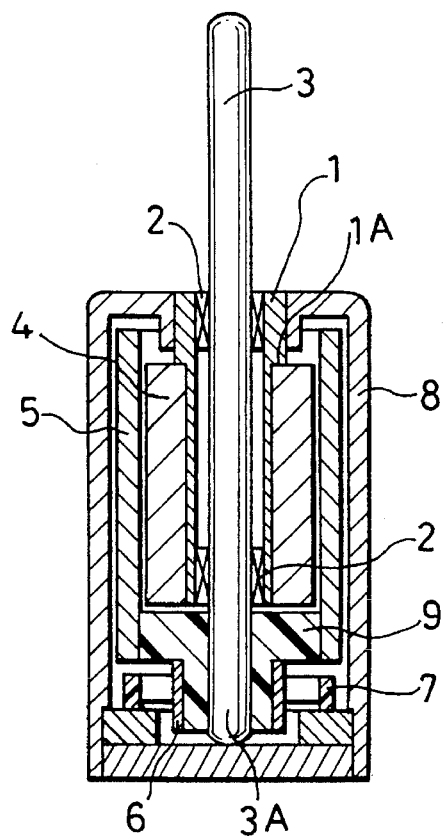
FIG. 23 is a cross section of the coreless motor in the prior art.

According to the first embodiment, since the shaft 13 is arranged in series with the magnet 17 on the same axis instead of passing through the magnet 17, the columnar magnet 17 having a large volume is usable. Additionally, since the diameters of the bearings 11A and 12A are not limited by an inner diameter of the magnet 4 as in the coreless motor of the prior art shown in FIG. 23. The bearings 11A and 12A of sufficiently large diameters are usable. Consequently, the diameter of the coreless motor can be reduced under the condition that the magnet 17 has a required volume to retain a sufficient torque and the bearings 11A and 12A have sufficient durabilities.

[Second embodiment]

Figure 3:
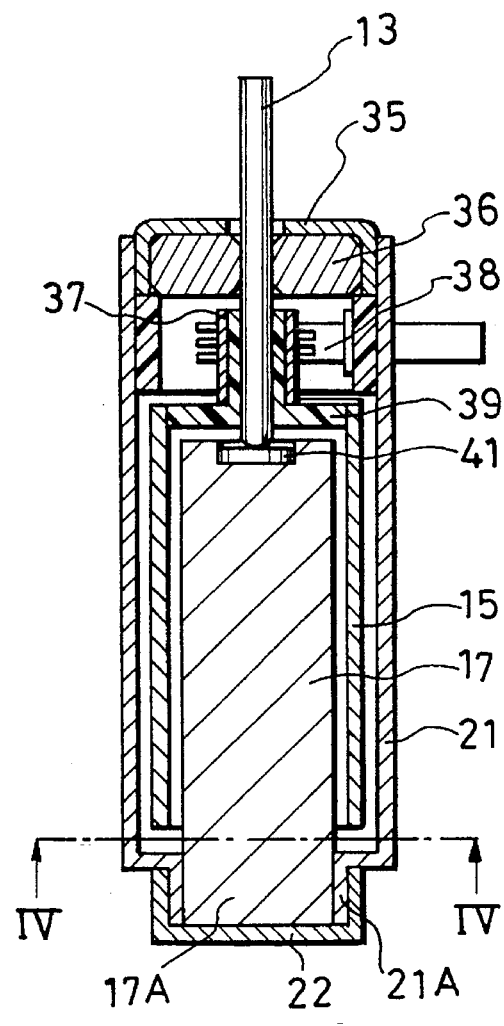
FIG. 3 is a cross section of a second embodiment of the coreless motor in accordance with the present invention.

FIG. 3 is a cross section of the second embodiment of the coreless motor in accordance with the present invention.

In the second embodiment, the shaft 13 is rotatably supported by a bearing metal 36 mounted in a housing 35. A commutator 37 is mounted on one end of the shaft 13, and brushes 38 each having three contact strips contact the commutator 37. The coil 15 is mounted on a flange 39 of the commutator 37 in a similar manner in the first embodiment. The shaft 13 passes through the flange 39, and the tip of the shaft 13 is in contact with a thrust plate 41 mounted on an end surface of the magnet 17. The thrust plate 41 is made of abrasion-resistive material and serves as a thrust bearing of the shaft 13.

Furthermore, as shown in FIG. 3, structure of an end part 21A of the frame 21, which support an end 17A of the magnet 17, is different from that of the first embodiment. The inner and outer diameters of the frame 21 are reduced at the end part 21A. Particularly, the inner diameter of the end part 21A is slightly smaller than the outer diameter of the end 17A of the magnet 17, and the end 17A of the magnet 17 is press-fitted softly in the end part 21A. Subsequently, the end part 21A is covered with a cap 22, and thereby the end 17A of the magnet 17 is closely held by the end part 21A.

Figure 4:
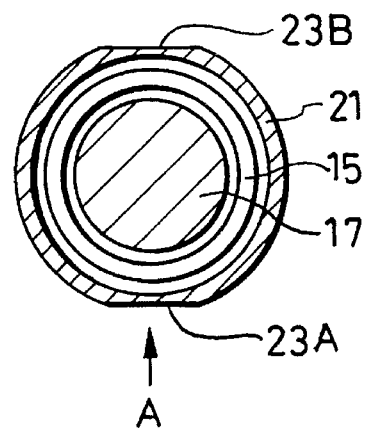
FIG. 4 is a IV—IV cross-sectional view of the coreless motor of the second embodiment.

In the second embodiment, in order to reduce a size in a diameter direction of the coreless motor as smaller as possible, opposite outer side walls of the cylindrical frame 21 are cut out as shown in IV—IV cross-section in FIG. 4, and therefore, flattened parts 23A and 23B are formed. Consequently, the size of the coreless motor is reduced in the diameter direction shown by an arrow A, and a posture of the coreless motor is stabilized at the instance of mounting in an apparatus.

Figure 5:
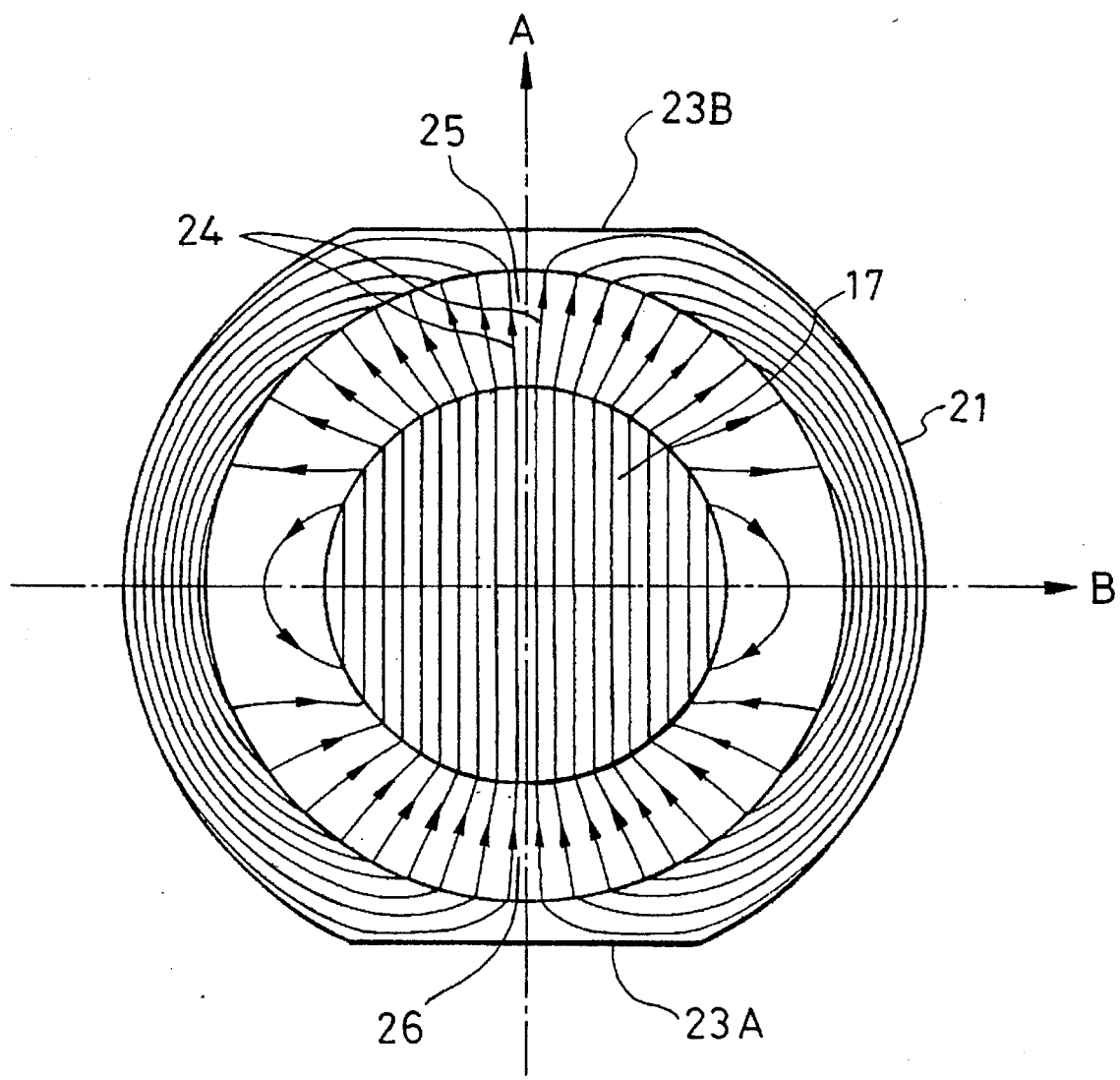
FIG. 5 is a distribution diagram of magnetic flux in the IV—IV cross-section.

It is important to set a direction of the magnetic poles of the magnet 17 perpendicularly to the flattened parts 23A and 23B in the second embodiment. In the coreless motor, the columnar magnet 17 is magnetized in a direction which is perpendicular to the axis. As shown in FIG. 5, in the case that the direction of the magnetic poles is set in the direction shown by the arrow A, which is perpendicular to the faces of the flattened parts 23A and 23B, lines of magnetic force start from the magnet 17, pass the air gap 25 between the magnet 17 and the frame 21, and enter the frame 21. Then, the lines of magnetic force return from the frame 21 to the magnet 17 through the air gap 26. In the above-mentioned case, substantially the entire lines of magnetic force issued from the magnet 17 pass through the frame 21, and leakage of the lines of the magnetic force outside the frame 21 is negligible, because a magnetic flux density is much lower in the vicinity of the flattened parts 23A and 23B than the magnetic flux density in the regions of the frame 21 around the direction of an arrow B which are perpendicular to the direction shown by the arrow A. Therefore, even the frame 21 having thin parts around the flattened parts 23A and 23B guides substantially the entire lines of magnetic force of the magnet 17. On the other hand, though the regions around the direction of the arrow B has higher magnetic flux density than the flattened parts 23A and 23B, the entire lines of magnetic force are guided by the sufficiently thick frame 21.

If the direction of the magnetic poles is set to the direction shown by the arrow B, the lines of the magnetic force are liable to leak outward in the vicinity of the flattened parts 23A and 23B, because the magnetic resistance at the flattened parts 23A and 23B are high. Consequently, the torque generated by the coreless motor is reduced, and undesirable magnetic influence is liable to be given to electronic components mounted adjacent to the coreless motor. As mentioned above, according to the second embodiment, the outer size of the coreless motor can be reduced without leakage of the lines of the magnetic force from the frame 21.

Figure 6:
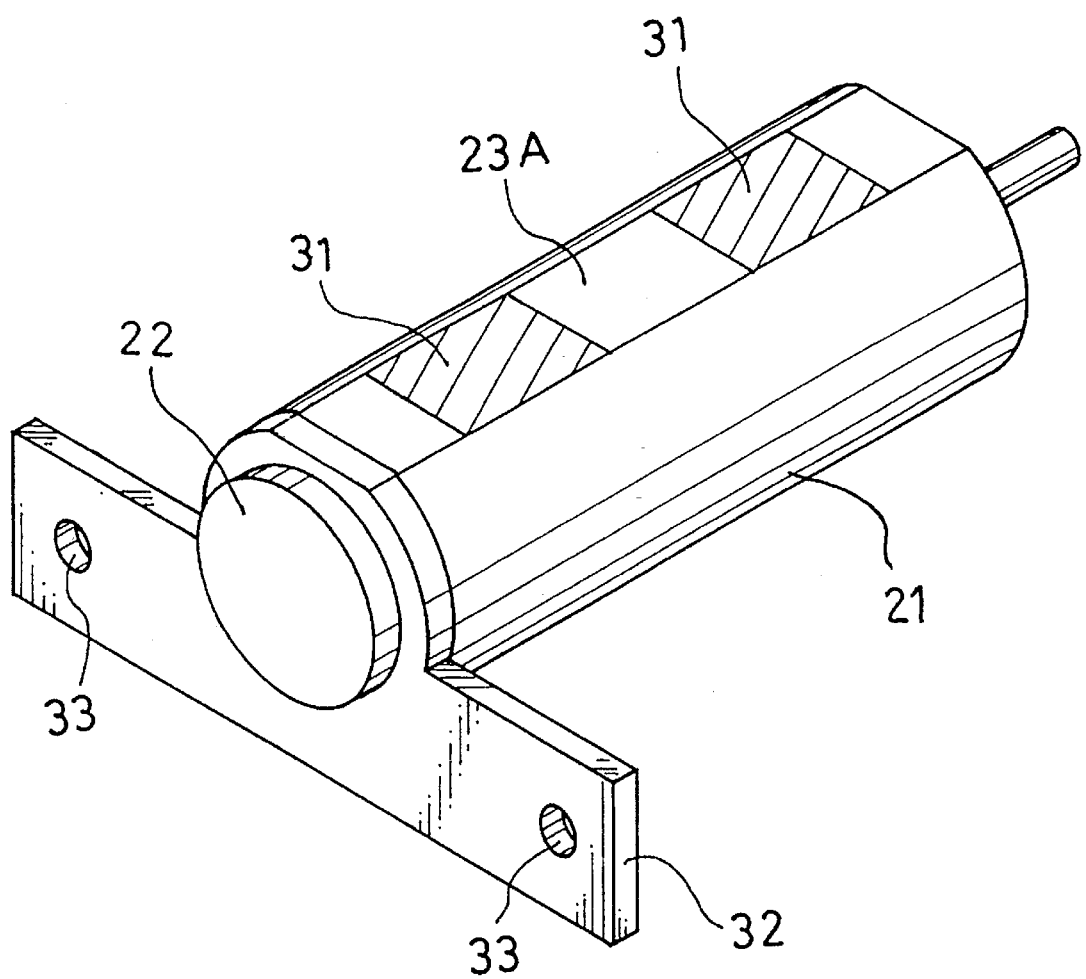
FIG. 6 is a perspective view of the coreless motor having a flange in the second embodiment.

FIG. 6 is a perspective view of an example of the coreless motor having mounting means in the second embodiment. In the example, solder-plated layers 31 are formed on the flattened part 23A. When the coreless motor is mounted on a printed circuit board (not shown), the solder-plated layers 31 are faced to the printed circuit board and is soldered thereto. According to this method, an additional component for mounting the coreless motor can be dispensed with, and a manufacturing cost is reduced. In the above-mentioned solder-fixing of the coreless motor, it may be fixed on the printed circuit board by using at least one fixing plate member having an opening, which has the same size and shape as that of the front and end parts of the frame 21, for embracing and firmly fixing the frame 21 in the opening. In this case, the flattened parts 23A and 23B serve as a detent to fix the posture of the coreless motor.

In a further example, the cap 22 is provided with a flange 32 as its extension having mounting holes 33 in one body, and the coreless motor may be mounted with the mounting holes 33. According to this example, a separate member is not necessary for mounting the coreless motor.

Figure 7:
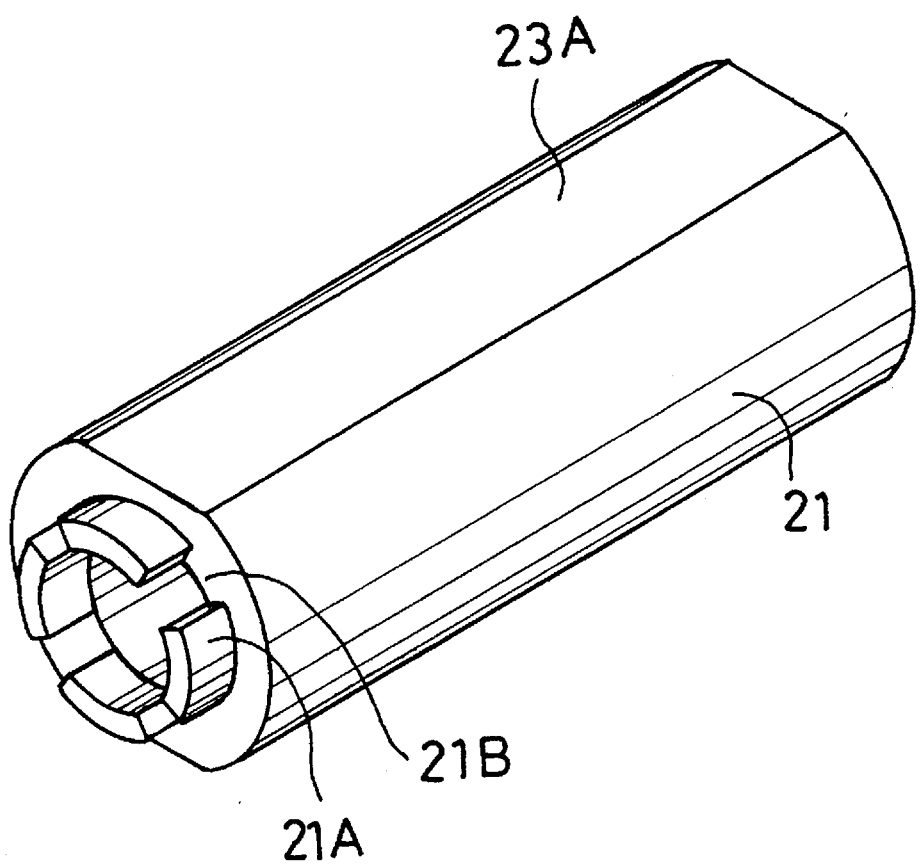
FIG. 7 is a perspective view showing a detailed magnet holding part of a frame in the second embodiment.

Preferably, the end part 21A of the frame 21 is divided by slits 21B as shown in FIG. 7, and thereby exfoliation of a rust prevention layer on the end part of the magnet 17 or break-down of a corner part is prevented in press-fit operation of the magnet 17.

[Third embodiment]

Figure 8:
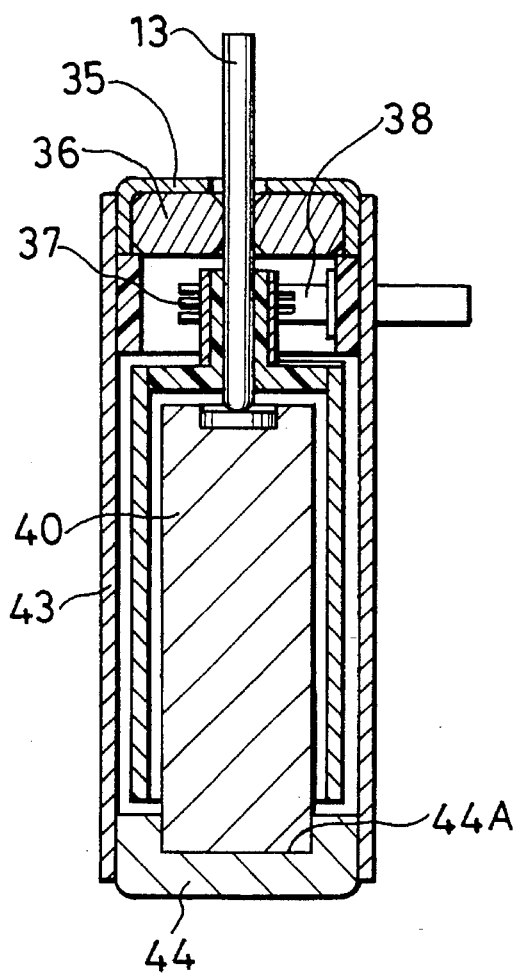
FIG. 8 is a cross section of a third embodiment of the coreless motor in accordance with the present invention.

FIG. 8 is a cross section of the third embodiment of the coreless motor in accordance with the present invention. In the third embodiment, respective shapes of a frame 43 and a bottom cover 44 are different from those of the second embodiment, and other configuration is identical with that of the second embodiment. The tubular frame 43 holds the housing 35 at the upper end in the similar manner of the second embodiment. A shallow cup-shaped bottom cover 44 having a recession 44A is inserted at the bottom end of the frame 44 as shown in FIG. 8. The bottom end of the magnet 40 is inserted in the recession 44A of the bottom cover 44, and thereby the magnet 40 is supported.

Figure 9:
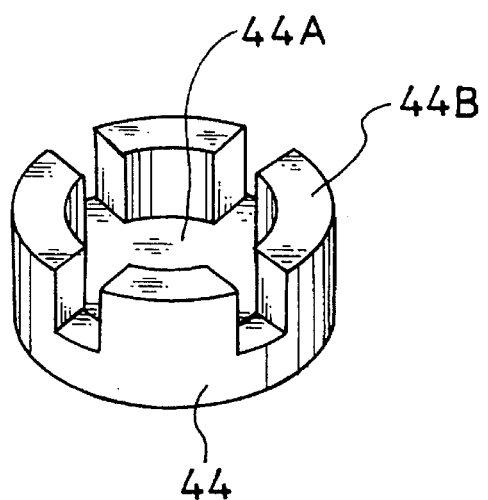
FIG. 9 is a perspective view of a bottom cover in the third embodiment.

FIG. 9 is a perspective view of the bottom cover 44. Referring to FIG. 9, the bottom cover 44 provided with four up-right rising holding parts 44B to hold the end of the magnet 40. The holding parts 44B are slightly bendable because they are divided by four slits. The holding parts 44B can tightly support the magnet 40 by press-fitting the bottom cover 44 with the magnet 40 into the frame 43.

[Fourth embodiment]

Figure 10:
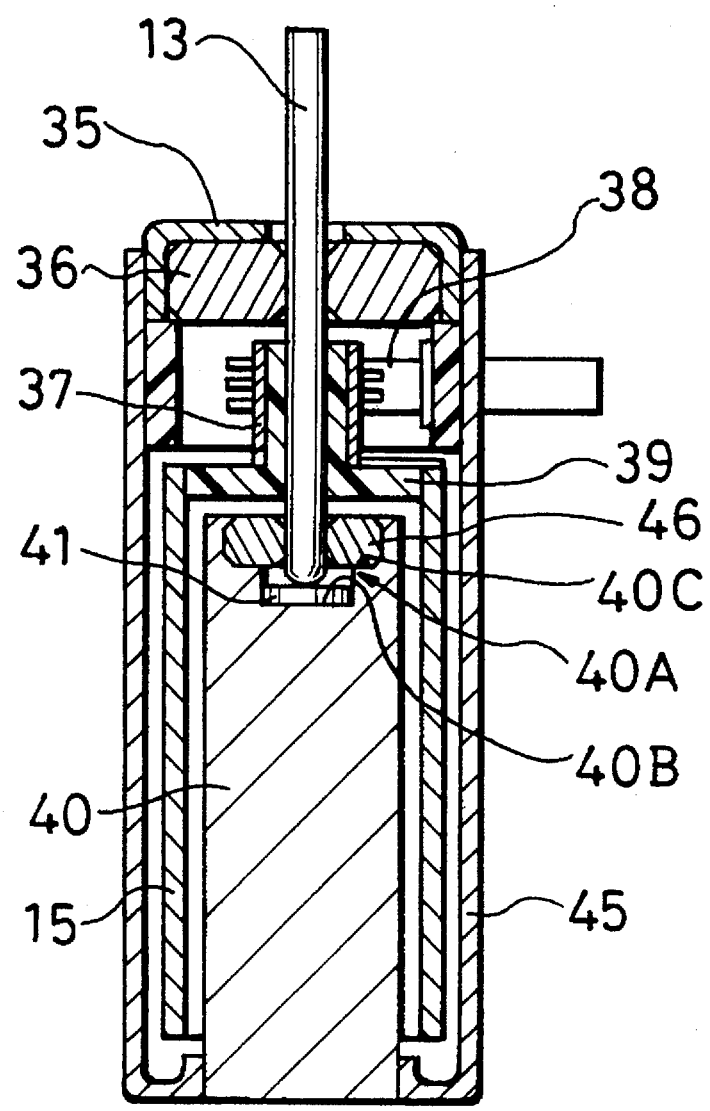
FIG. 10 is a cross section of a fourth embodiment of the coreless motor in accordance with the present invention.

FIG. 10 is a cross section of the fourth embodiment of the coreless motor in accordance with the present invention. In the fourth embodiment, a recession 40A having two levels is bored from the inner end surface of the magnet 40. The recession 40A is composed of a deep part 40B and a shallow part 40C. A thrust plate 41 is inserted in the deep part 40B, so as to support the thrust of the shaft 13. A bearing metal 46 is inserted in the shallow part 40C of the recession 40A, and the shaft 13 is supported by the metal 46 in addition to the metal 36 mounted in the housing 35. The other end of the magnet 40 is inserted in the end part of the frame 45 folded inward. Other configuration is similar to that of the second embodiment shown in FIG. 3. In the third embodiment, since the shaft 13 is supported by the two bearing metals 36 and 46, stable revolution of the shaft 13 is realizable in a case where large force is applied to the shaft 13 in the direction perpendicular to the axis of the shaft 13.

[Fifth embodiment]

Figure 11:
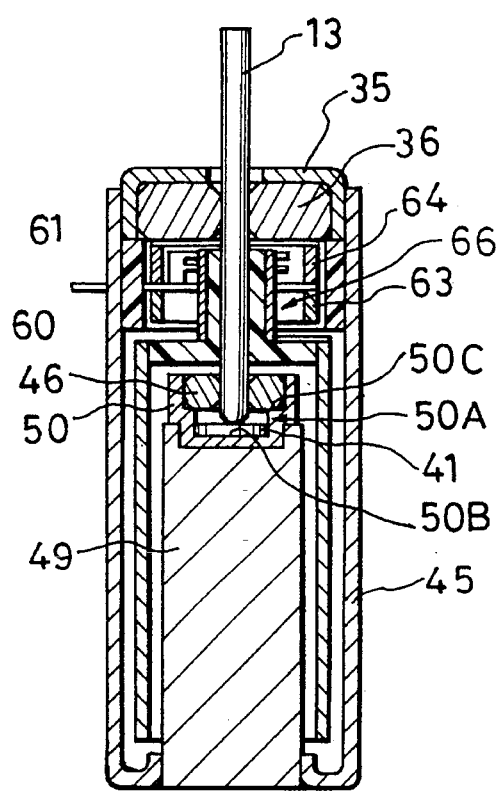
FIG. 11 is a cross-sectional view of a fifth embodiment of the coreless motor in accordance with the present invention.

FIG. 11 is a cross section of the fifth embodiment of the coreless motor in accordance with the present invention. In the embodiment, a cup-shaped housing 50 is press-fitted or adhered in a recession of the end surface of the magnet 40. The housing 50 is made of a metal plate and is formed by press-forming, for example. The housing 50 has two level recessions with a deep part 50B and a shallow part 54. A thrust plate 41 is inserted in the deep part 50B, and thereby the thrust of the shaft 13 is supported. The bearing metal 46 is inserted in the shallow part 54, and the shaft 13 is rotatably supported by the metal 46 and the metal 36 mounted in the housing 35. In the coreless motor of the fifth embodiment, a brush assembly 66 is mounted. The brush assembly 66 is described in detail hereafter. Other configuration is similar to that of the fourth embodiment shown in FIG. 10.

According to the fifth embodiment, the bearing metal 46 and the thrust plate 41 are mounted in the housing 50 in advance, and subsequently, the housing 50 is mounted in the magnet 49. Though the number of the parts increases due to addition of the housing 50, it is not necessary to form the recession 40A of two levels as shown in FIG. 10 in the end part of the magnet 49.

Figure 12:
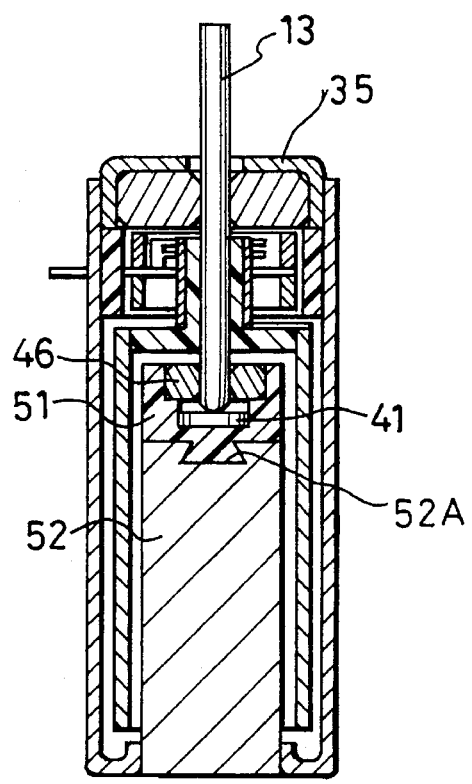
FIG. 12 is a cross section of the other example of the fifth embodiment of the coreless motor.

FIG. 12 is a cross section of the other example of the fifth embodiment. In the example, a housing 51 made of plastics is inserted in the end part of the magnet 52. In the forming process of the housing 51, the magnet 52 having a hole 52A in which diameters are gradually enlarged toward the bottom of the hole 52A is set to an injection molding machine of plastics. Subsequently, molding and insertion of the housing 51 into the hole 52A are simultaneously performed. Therefore, the forming process in this example is completed within a short time, and is preferable for mass production. Incidentally, the inner configuration of the housing 51 is identical with that of the housing 50 shown in FIG. 11.

[First embodiment of brush]

Figure 13:
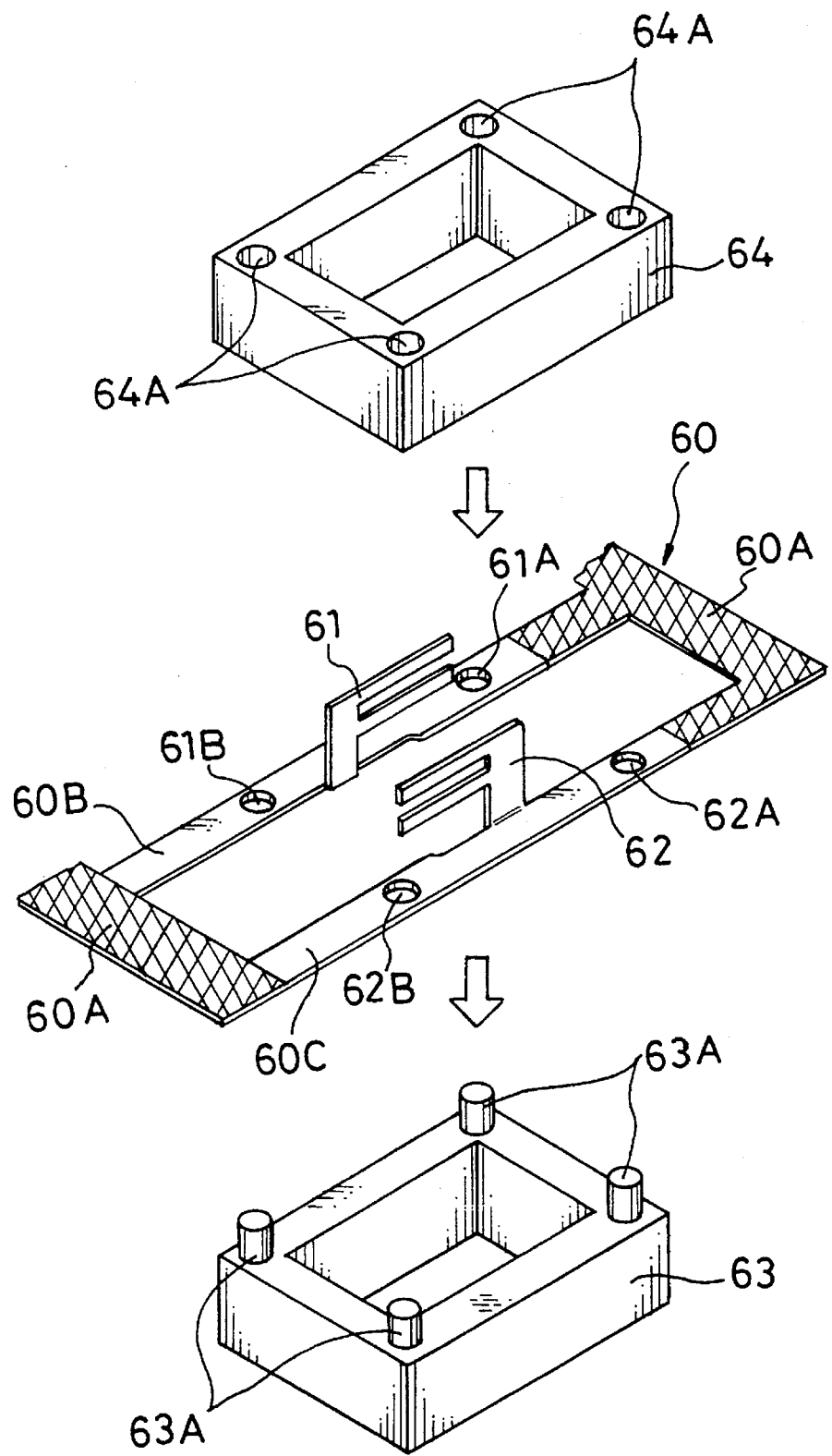
FIG. 13 is a perspective view of a configuration of a brush which is used in each embodiment of the coreless motor in accordance with the present invention.

FIG. 13 is a perspective view of a first embodiment of a brush which is usable in the coreless motor of each of embodiments of FIG. 1 through FIG. 12 of the present invention. Referring to FIG. 13, a frame-shaped brush unit 60 is formed by means of cutting and bending in press-working of a thin metal plate, and comprises terminal members 60B, 60C having four positioning holes 61A, 61B, 62A, 62B, two brushes 61, 62, and connection parts 60A. Two brushes 61 and 62 are folded perpendicularly to the terminal members 60B and 60C. After assembly of the brush unit 60, the connection parts 60A are cut off. Holders 63, 64 are made of insulative material such as plastics, and the holder 63 has four protrusions 63A which are inserted in the above-mentioned positioning holes 61A, 61B, 62A and 62B of the terminal members 60B and 60C in assembly. Moreover, the holder 64 has four holes 64A at the positions corresponding to the positioning holes 61A, 61B, 62A and 62B.

Figure 14:
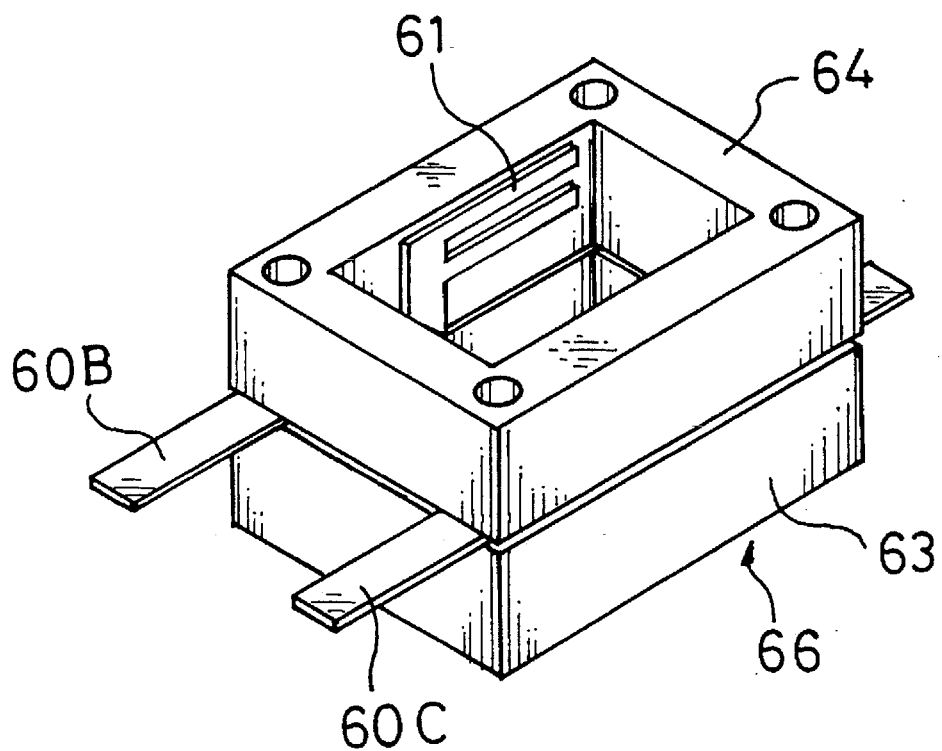
FIG. 14 is a perspective view of a brush assembly of the configuration shown in FIG. 13.

In the assembly operation, the four protrusions 63A of the holder 63 pass through the respective positioning holes 61A–62B and are inserted in the respective holes 64A of holder 64, and the brush unit 60 is sandwiched by both the holders 63 and 64. After assembly, the connection parts 60A (hatched parts) of the brush unit 60 are cut and removed. Consequently, a brush assembly 66 is formed as shown in FIG. 14. The coreless motors of the fifth embodiment shown in FIGS. 11 and 12 are provided with the brush assembly 66.

According to the brush assembly of the present invention, since the brushes 61 and 62 and the respective terminal members 60B and 60C are formed on one sheet of metal plate, no wiring is necessary between the brushes 61, 62 and the respective terminal members 60B, 60C. Consequently, configuration of the brush assembly 66 is simplified, and thereby a fabricating cost is reduced. Since the connection parts 60A are removed after assembly process which clamp the frame-shaped brush unit 60 with the holders 63 and 64, the brush unit 60 is easily assembled even if a very thin metal sheet is used for the brush unit 60 in order to obtain a low brush pressure.

[Second embodiment of brush]

Figure 15:
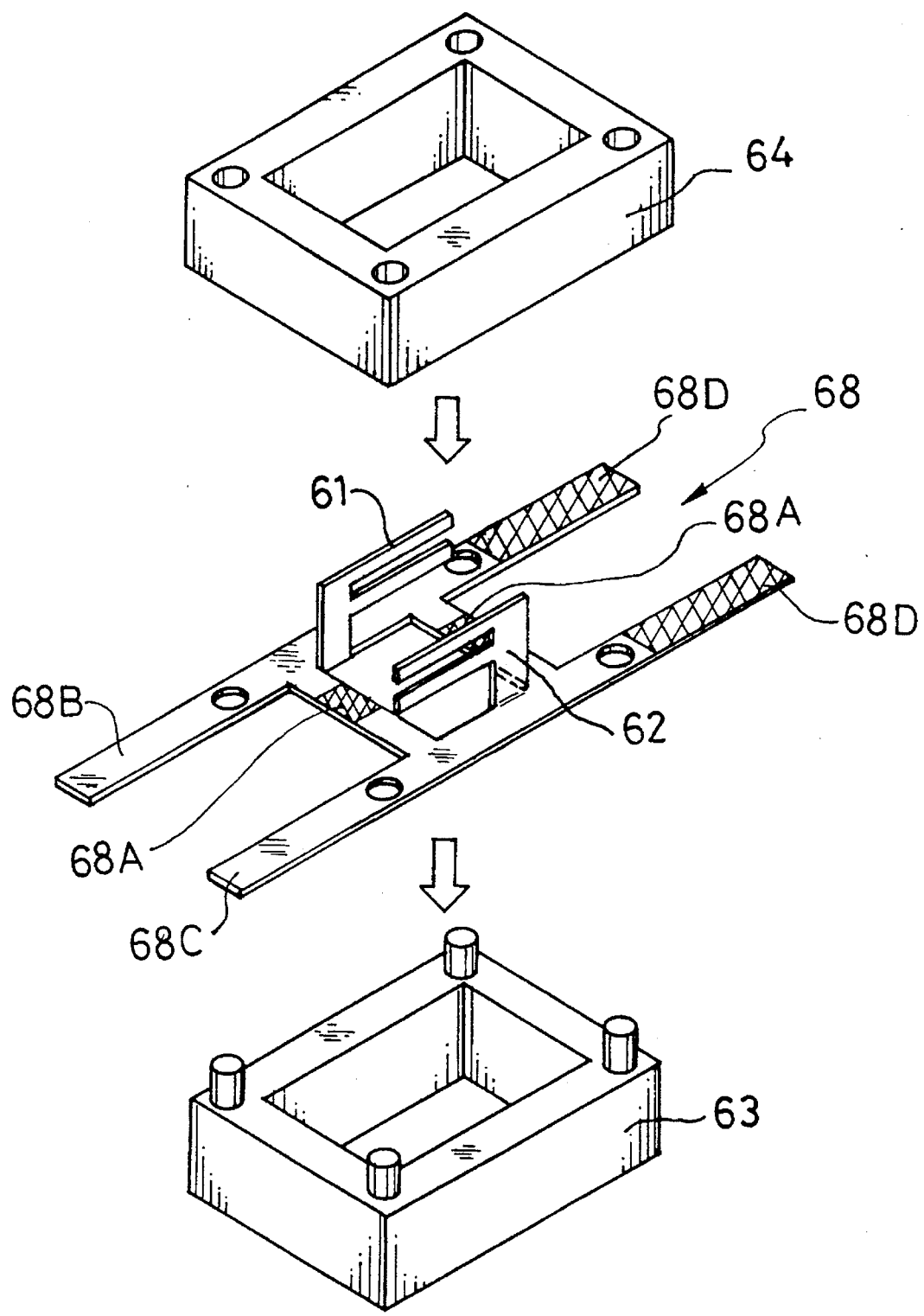
FIG. 15 is a perspective view of the other type of configuration of a brush which is used in each embodiment of the coreless motor in accordance with the present invention.

FIG. 15 is a perspective view of a brush of the second embodiment which is used in the coreless motor of each of embodiments of FIG. 1 through FIG. 12 of the present invention. In the embodiment, the brush unit 68 is substantially H-shaped and has two connection parts 68A on one sheet of metal. The brush unit 68 is sandwiched by the holders 63 and 64 in the like manner to FIG. 13, and a brush assembly is formed. Subsequently, the connection parts 68A and unnecessary terminal members 68D, for example, are cut and removed, and a brush assembly having the same configuration as the brush assembly 66 shown in FIG. 14 is obtainable. Incidentally, in FIG. 14, in the case that it is required to extract rightward the terminal members 60B and 60C, the terminal members 68D (hatched parts) in FIG. 15 are not cut, but the terminal members 68B and 68C are cut.

Figure 16:
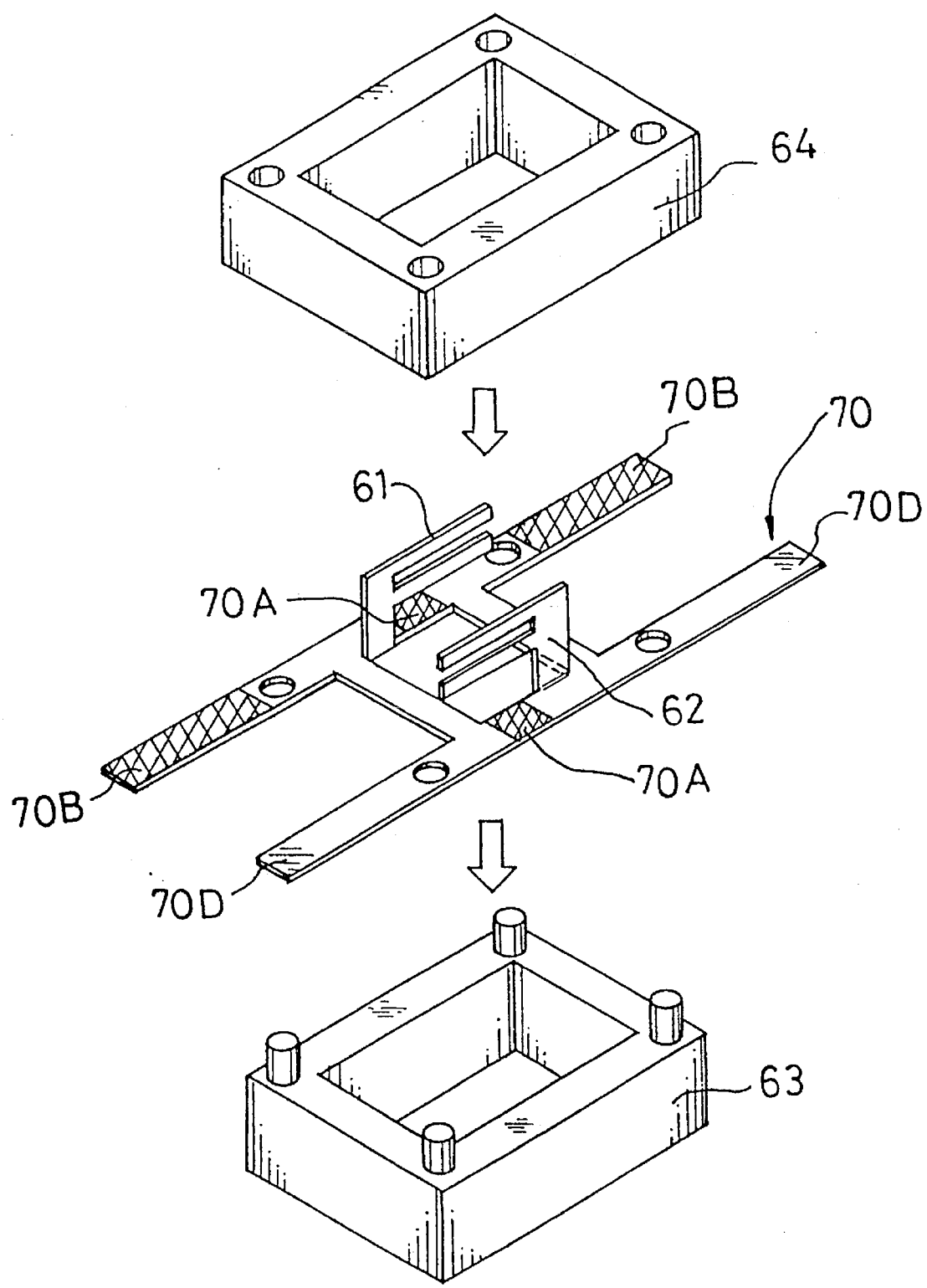
FIG. 16 is a perspective view of a configuration of a brush in the other example of the configuration in FIG. 15.
Figure 17:
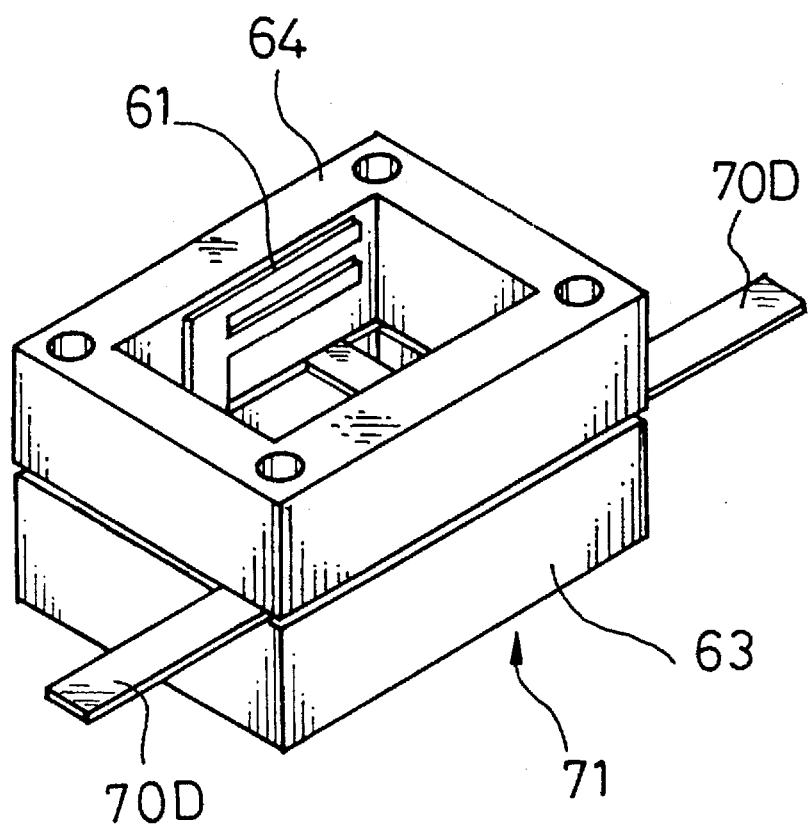
FIG. 17 is a perspective view of a brush assembly of the configuration shown in FIG. 16.

FIG. 16 is a perspective view of a brush assembly in the other example of the embodiment. In the example, the shape of a brush unit 70 formed on one sheet of metal is identical with that shown in FIG. 15. Central parts 70A (hatched parts) of terminal members 70B and terminal members 70D are cut before assembly in the holders 63 and 64, and both the terminal members 70B (hatched parts) are cut after assembly. A completed brush assembly 71 is shown in FIG. 17. In this example, since both the terminal members 70D are extracted right- and leftward, it is available to extend the wirings of the brush assembly 71 both right- and leftward.

[Third embodiment of brush]

Figure 18:
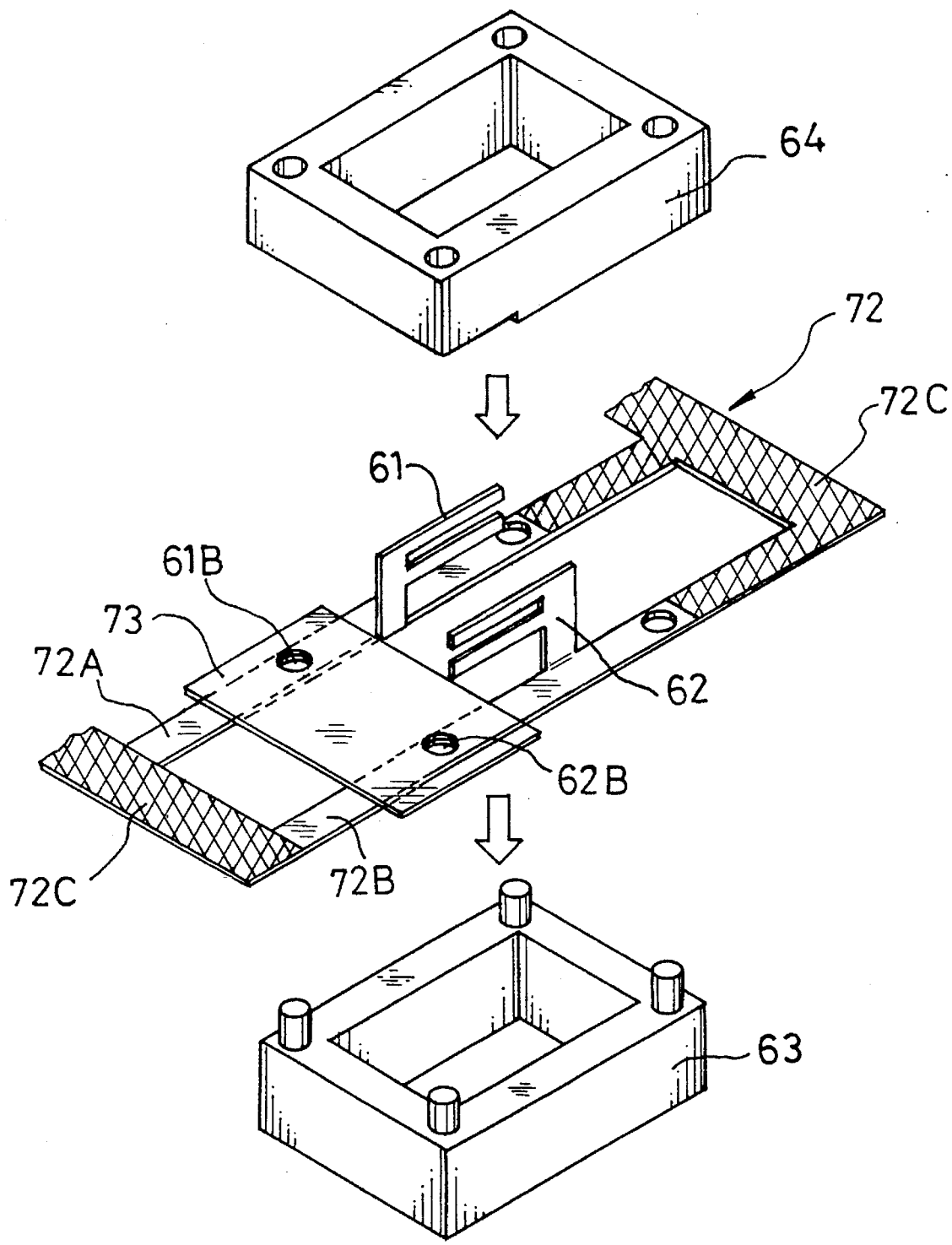
FIG. 18 is a perspective view of a configuration of a brush which is used in each embodiment of the coreless motor in accordance with the present invention.
Figure 19:
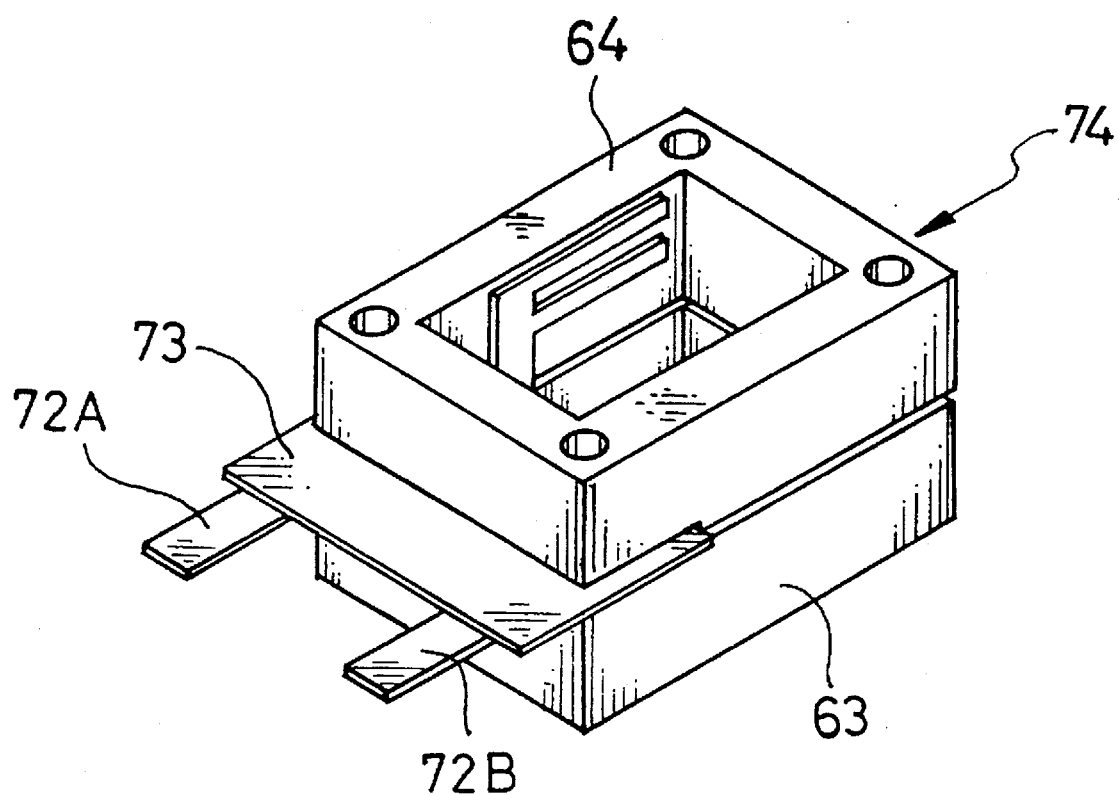
FIG. 19 is a perspective view of a brush assembly of the configuration of the brush shown in FIG. 18.

FIG. 18 is a perspective view of a brush of the third embodiment used in the coreless motor of each embodiment of FIG. 1 through FIG. 12 of the present invention. In the embodiment, a frame-shaped brush unit 72 is formed on one sheet of metal, and two brushes 61 and 62 are folded perpendicularly to terminal members 72A and 72B. An insulating tape 73 having thermo-setting adhesive on one surface thereof is adhered across the terminal members 72A and 72B of the brush unit 72. The insulating tape 73 is made preferably to cover the positioning holes 61B and 62B. In this case, after adhering of the insulating tape 73, the positioning holes 61B and 62B are bored through with a drill. The brush unit 72 is sandwiched with the holders 63 and 64. Subsequently, both the connection parts (hatched parts) 72C are cut off and a brush assembly 74 shown in FIG. 19 is completed. Since the insulating tape 73 is adhered across both the terminal members 72A and 72B, the terminal members 72A and 72B are insulated from other elements. Additionally, since the interval between the terminal members 72A and 72B is held to a constant distance by the insulating tape 73, such trouble as a shortcircuit between them may by prevented.

Figure 20:
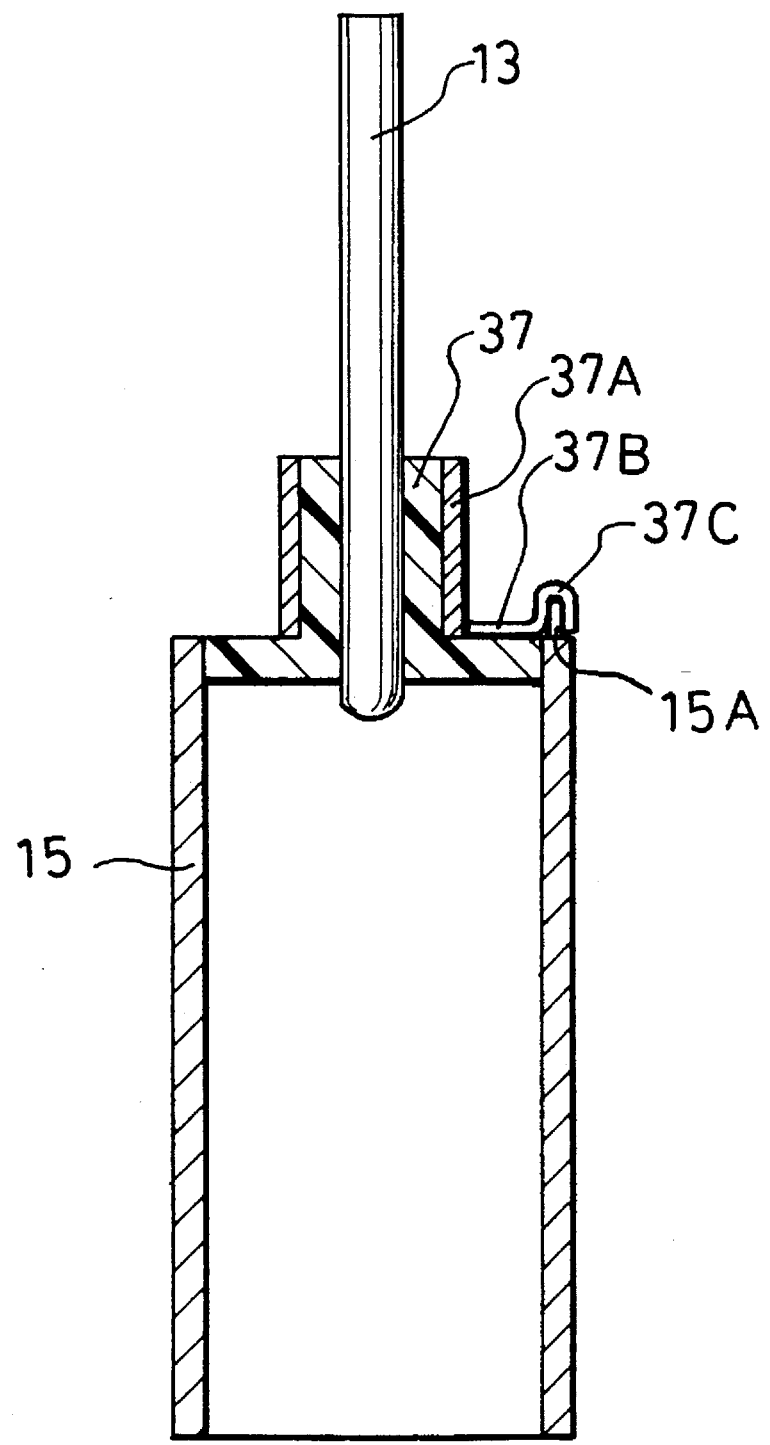
FIG. 20 is a cross section of a coil and commutator of the coreless motor in accordance with the present invention.
Figure 21:
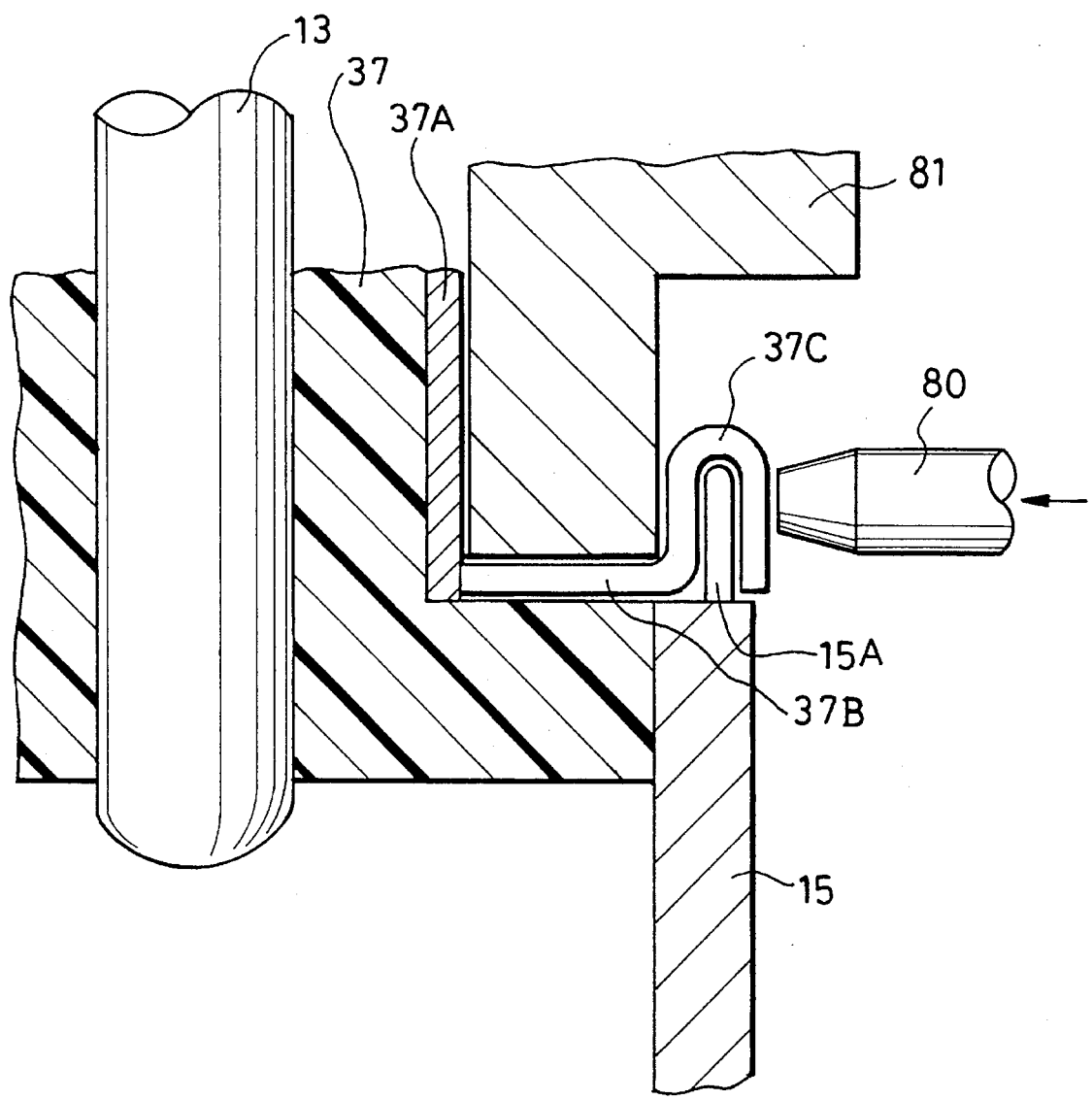
FIG. 21 is a cross section showing an assembly process of the coreless motor.

FIG. 20 is a cross section showing a connecting part of a terminal 15A of the coil 15 and the commutator 37 in the coreless motor in accordance with the present invention. Referring to FIG. 20, a U-shaped connecting part 37C is connected to a segment 37A of the commutator 37 through a connection member 37B. The segment 37A, connection member 37B and U-shaped connecting part 37C may be constructed in one body. The terminal 15A which is an end of a winding of the coil 15 is coated with insulating paint. The terminal 15A is inserted in the U-shaped hollow of the connecting part 37C. Subsequently, as shown in FIG. 21, the connecting part 37C is clamped by electrodes 80 and 81 of a resistance welder and the terminal 15A and the connecting part 37C are subjected to resistance-welding in a manner that which is well known in the art. Since the terminal 15A sandwiched in the U-shaped part of the connecting part 37C is pressed by both the electrodes 80 and 81 through the connecting part 37C and a welding current is applied, the insulating paint of the terminal 15A is broken by a pressing force and a heat which is generated in the connecting part 37C, and thus the terminal 15A is electrically connected to the connecting part 37C. Therefore, the insulating paint of the terminal 15A need not be removed prior to the resistance welding, and thus assembly operation is simplified. In the coreless motors in the embodiments of the present invention, three segments 37A each having about 120° arc section are mounted on the circle of the commutator 37, and three connecting parts 37C are connected to the respective terminals 15A of the coil 15.

Figure 22:
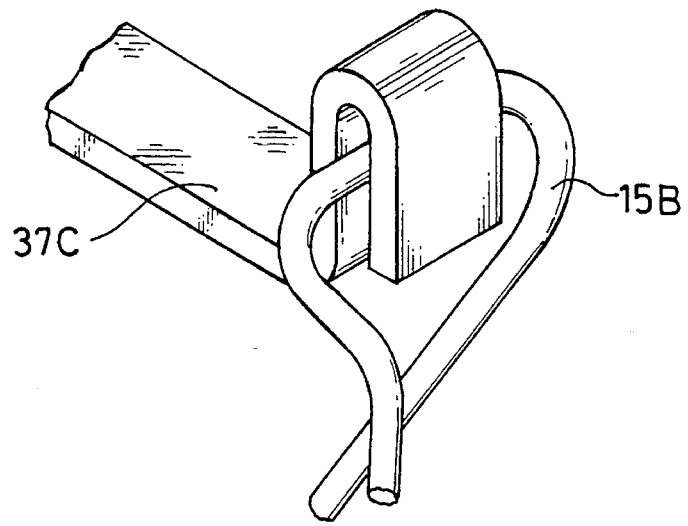
FIG. 22 is a cross-sectional view showing the other example of the assembly process.

FIG. 22 is a cross section of the other example of the connecting part of the coil 15 and the commutator 37. In this example, a ring-shaped terminal 15B of the coil 15 is inserted in the U-shaped hollow of the connecting part 37C. The connecting part 37C is clamped by the electrodes 80 and 81 of FIG. 21 and is resistance-welded in a similar manner as shown in FIG. 21. Consequently, the terminal 15B is electrically connected to the connecting part 37C.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A coreless motor comprising:

a cylindrical frame of magnetic material having an inner wall, a circular hole, and at least one flattened part formed on an outer wall thereof;

a columnar magnet inserted in said frame such that said magnet is held by said frame with a gap between the inner wall of said frame and an outer wall of said columnar magnet and a direction of the magnetic poles of said columnar magnet is perpendicular to a plane of said at least one flattened part of said frame, a shaft held rotatably on said frame in coaxial relation to an axis of said columnar magnet and in series with said columnar magnet, and a circular cylindrical coil mounted coaxially on said shaft and positioned in said gap.

2. A coreless motor in accordance with claim 1, wherein said shaft is rotatably supported by two bearings positioned with a predetermined distance therebetween.

3. A coreless motor in accordance with claim 2, wherein a member having a predetermined weight is eccentrically mounted on said shaft between said two bearings.

4. A coreless motor in accordance with claim 1, wherein said at least one flattened part is solder-plated.

5. A coreless motor in accordance with claim 1, wherein a bearing of said shaft is mounted on an end face of said columnar magnet.

6. A coreless motor in accordance with claim 5, wherein said bearing is mounted in a housing fixed on said end face of said columnar magnet.

7. A coreless motor in accordance with claim 5, wherein said bearing is mounted in a housing molded in one body on said end face of said columnar magnet.

8. A coreless motor comprising:

a columnar magnet;

a cylindrical frame of magnetic material having a circular hole therein, said frame being formed with bent holding members at an end part thereof for holding one end of said magnet therein with a gap between an inner wall of said frame and an outer wall of the columnar magnet, a cup-shaped member press-fitted over said end part of said frame for holding said magnet therein;

a shaft held rotatably on said frame in coaxial relation to an axis of said columnar magnet and in series with said columnar magnet; and a cylindrical coil mounted coaxially on said shaft and positioned in said gap.

9. A coreless motor in accordance with claim 8, wherein said cup-shaped member is provided with at least one flange for mounting said coreless motor.

10. A coreless motor comprising:

a cylindrical frame of magnetic material having a circular hole, a magnet inserted in said frame such that said magnet is held by said frame with a predetermined gap between an inner wall of said frame and an outer wall of said magnet, a shaft held rotatably on said frame, a circular cylindrical coil mounted on said shaft and positioned in said gap, a commutator installed on said shaft and connected to said coil, and brush means for supplying electric power to said commutator by contacting with said commutator, wherein said commutator comprises at least two U-shaped coil connecting members with terminals of said coil formed into a ring hung in said U-shaped coil connecting members.

11. A coreless motor in accordance with claim 10, wherein said terminals of said coil are resistance-welded to said respective U-shaped coil connecting members.

* * * * *